United States Patent [19]

Schoenborn

[11] Patent Number: 5,941,563
[45] Date of Patent: Aug. 24, 1999

[54] AIRBAG DIFFUSER

[75] Inventor: Randall J. Schoenborn, Zeeland, Mich.

[73] Assignee: Illinois Tool Works, Inc., Glenview, Ill.

[21] Appl. No.: 09/014,787

[22] Filed: Jan. 28, 1998

[51] Int. Cl.⁶ .................................................. B60R 21/26
[52] U.S. Cl. ........................................... 280/740; 280/736
[58] Field of Search ..................... 280/740, 736, 280/742, 741, 728.1

[56] References Cited

U.S. PATENT DOCUMENTS

| | | | |
|---|---|---|---|
| 3,411,807 | 11/1968 | Carey et al. | 280/740 |
| 4,068,862 | 1/1978 | Ishi et al. | 280/740 |
| 5,671,945 | 9/1997 | Rhule et al. | 280/740 |
| 5,716,072 | 2/1998 | O'Driscoll | 280/740 |
| 5,752,715 | 5/1998 | Pripps et al. | 280/740 |
| 5,820,160 | 10/1998 | Johnson et al. | 280/736 |

*Primary Examiner*—Christopher P. Ellis
*Attorney, Agent, or Firm*—Welsh & Katz, Ltd.; Thomas W. Buckman, Esq.

[57] ABSTRACT

A diffuser for a supplemental restraint system includes a top wall, a cylindrical side wall and a bottom wall defining a diffuser chamber. The diffuser is used in a supplemental restraint system having an airbag and a combustion chamber for providing a pressurized gas to inflate the airbag. The combustion chamber defines an opening therein for exhausting the pressurized gas. The diffuser is a substantially cylindrical member defining a longitudinal axis. The bottom wall has an opening having a predetermined flow area, that is adjacent to and separated from the combustion chamber opening. The diffuser includes a plurality of elongated slots formed therein by lancing, that are generally parallel to the diffuser axis. The slots are configured, and have a flow area, to rapidly inflate the airbag. The slots are further configured to retain debris generated from the combustion chamber within the diffuser and to prevent the debris from entering the airbag upon inflation. The slots are formed by lancing that forms first and second flashing portions on an interior of the cylindrical side all that remain connected to and intact with the side wall upon formation.

9 Claims, 2 Drawing Sheets

AIRBAG DIFFUSER

FIELD OF THE INVENTION

This invention pertains to diffusers for supplemental restraint systems or airbags. More particularly, this invention pertains to a one-piece airbag diffuser having a plurality of slotted openings for distributing or diffusing the airbag combustion gas products.

BACKGROUND OF THE INVENTION

Supplemental restraint systems or airbags have become an important safety feature in today's automobiles. Airbag deployment technology currently uses a controlled combustion or an explosion to rapidly deploy the airbag. The chemicals that create this controlled explosion are housed in a combustion chamber or housing. The combustion gas products are expelled from the chamber through a diffuser into the airbag to deploy or inflate the airbag.

A number of techniques are known to inflate the airbag, such as the use, through combustion, of powdered sodium azide. The combustion reaction creates an instantaneous increase in pressure of between about 12,000 pounds per square inch (psi) and about 16,000 psi. This instantaneous pressure increase inflates the airbag.

Airbag deployment requires proper diffusion of the combustion gases to inflate the airbag. One known deployment system includes a combustion chamber, for carrying out and containing the combustion process. The chamber includes an opening in an end thereof for directing the combustion gases. The combustion chamber is mounted or connected to a diffuser, at the opening in the chamber, that is in flow communication with the interior region of the airbag.

The diffuser extends into the airbag and diffuses or distributes the gases generated from the combustion process within the airbag to properly deploy the bag. The diffuser must have sufficient open or flow area to permit the gases to flow from the combustion chamber into the airbag to rapidly and properly deploy the bag.

A burst disk is positioned at about the combustion chamber opening. The burst disk isolates the diffuser from the combustion chamber prior to combustion, and prevents the combustion products from rupturing the wall of the combustion chamber or flowing backward out through the chamber upon deployment.

Because of the explosive nature of the combustion process, it has been observed that debris, such as burst disk portions or fragments and combustion product powder particles can be generated. This debris is not intended to enter the airbag upon deployment. Rather, the debris is isolated and remains within the combustion chamber and diffuser subsequent to combustion.

One arrangement that is used to retain this debris within the combustion chamber and diffuser includes a generally cylindrical diffuser having a plurality, e.g., eight, large apertures therein and a steel screen positioned within the diffuser. The screen includes a large number of relatively small openings to prevent egress of the debris subsequent to combustion. The diffuser includes a separate end wall that is secured, such as by welding, to the diffuser at the connection to the combustion chamber after the screen is mounted in the diffuser.

Although this arrangement works well for its intended function, there are multiple parts and manufacturing process steps required to fabricate the diffuser and to fixedly position the screen within the diffuser. As such, this part can be relatively costly to manufacture.

Attempts have been made to utilize other configurations that provide sufficient flow area to assure rapid deployment of the airbag, while at the same time maintaining debris within the combustion chamber and diffuser. Such configurations include the drilling or punching a plurality of small openings within the diffusion chamber wall. Such manufacturing processes are, however, costly and can require frequent maintenance of the machining or manufacturing parts.

In addition, it has been found that drilling or punching the openings in the diffuser cannot be performed with reliability after the diffuser is fully formed. That is, when the bottom end wall of the diffuser is formed after the openings are drilled or punched, the openings tend to become deformed as a result of the wall formation. Deformation of the openings can result in less than optimal diffusion characteristics for the diffuser. On the other hand, when attempting to punch or drill the openings after the bottom wall is formed, the machining operation can become maintenance intensive. As a result, known diffusers utilize a multiple-piece construction.

Accordingly, there continues to be a need for a diffuser that is readily manufactured, and that incorporates debris retaining characteristics while at the same time providing sufficient flow area for rapid deployment of the airbag. Such as diffuser is a one-piece member that is cost-effective to manufacture and does not adversely effect or increase machine-tool maintenance.

SUMMARY OF THE INVENTION

A diffuser for use in a supplemental restraint system includes a top wall, a cylindrical side wall and a bottom wall defining a diffuser chamber. The diffuser defines a longitudinal axis, and is used in a supplemental restraint system having an airbag and a combustion chamber for providing a pressurized gas to inflate the airbag. The combustion chamber has an opening therein for exhausting the pressurized gas.

The diffuser is a substantially cylindrical member and includes an opening therein having a predetermined flow area. The opening is adjacent to and separated from the combustion chamber opening. The diffuser has a plurality of elongated, through-wall slots formed therein generally parallel to the diffuser axis. The slots are configured, and have a flow area, to rapidly inflate the airbag upon deployment. The slots are further configured to retain debris generated from the combustion process or reaction within the diffuser and to prevent the debris from entering the airbag upon inflation.

In a current embodiment, the diffuser includes sixteen slots. The slots have a generally rectangular shape, and each slot has a height extending parallel to the axis of about 0.20 in and a width of between about 0.03 in and 0.04 in, for a total flow area of between about 0.096 $in^2$ and about 0.128 $in^2$.

Preferably, the slots are formed by lancing and the slots define first and second flashing portions from the lancing formation. In a most preferred arrangement, each of the first and second flashing portions remains intact with the diffuser, so as to not create cutting debris.

In a current embodiment, the total flow area of the slots is greater than or equal to the flow area of the opening in the diffuser bottom wall.

Other features and advantages of the present invention will be apparent from the following detailed description, the accompanying drawings, and the appended claims.

DETAILED DESCRIPTION OF THE PREFERRED EMBODIMENTS

Figure 1:
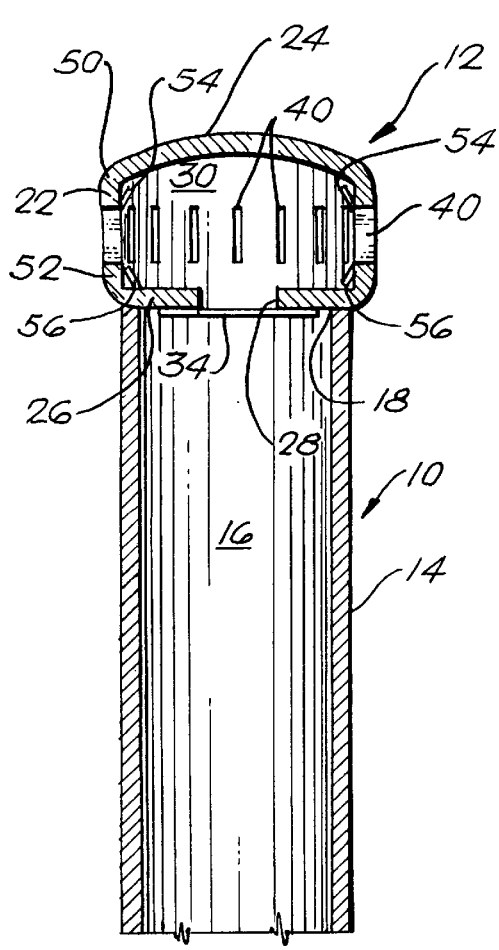
FIG. 1 is a partial cross-sectional view of a diffuser in accordance with the principles of the present invention, the diffuser being illustrated mounted to a combustion chamber, with a burst disk positioned at the diffuser opening to the combustion chamber.

While the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

Referring now to the figures, and in particular to FIG. 1, there is shown an exemplary combustion chamber 10 having a diffuser 12 in accordance with the principles of the present invention mounted to an end of the chamber 10. The illustrated combustion chamber 10 is one of a type that is used in the automotive industry for rapid deployment of the supplemental restraint system or airbag. The combustion chamber 10 includes a housing 14 and an internal combustion region 16, and has an opening 18 in an end of the housing 14 for discharging combustion gases.

Figure 2:
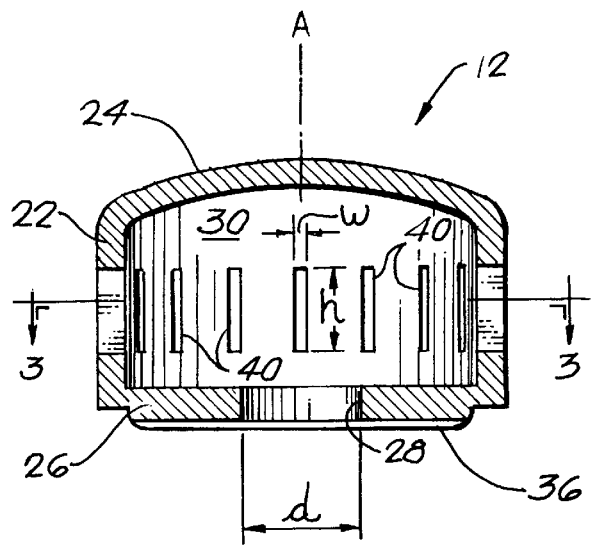
FIG. 2 is a cross-sectional view of the diffuser of FIG. 1.
Figure 3:
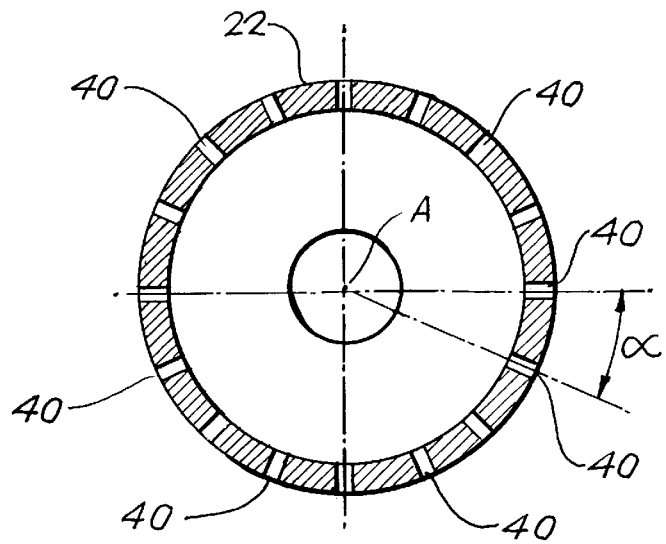
FIG. 3 is a cross-sectional view of the diffuser of FIG. 2, taken along line 3—3 of FIG. 2.

The diffuser 12 is mounted to an end of the combustion chamber 10 over the opening 18. The diffuser 12 is essentially a short, cylindrical element having a cylindrical side wall 22, a top wall portion 24 that may be flat or dished, and a bottom wall portion 26 having an opening 28 therein. The diffuser top wall 24, side wall 22 and bottom wall 26 define a diffuser chamber 30. The diffuser 12 can be mounted to the combustion chamber 10 (as illustrated in FIGS. 1 and 2) at the bottom wall 26 with the opening 28 of the diffuser 12 adjacent to the opening 18 in the chamber 10.

Figure 4:
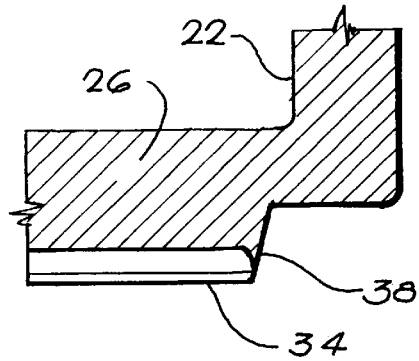
FIG. 4 is a partial view of the diffuser as indicated in FIG. 2.

In a typical arrangement, a burst disk 34 is positioned over the bottom wall opening 28 at an outer surface 36 of the bottom wall 26. The burst disk 34 isolates the diffuser chamber 30 from the combustion region 16 of the combustion chamber 10. As shown in FIG. 4, in one configuration, the diffuser 10 includes a circumferential lip 38 to which the burst disk 34 is mounted. As is apparent from the drawings, with the burst disk 34 in place between the diffuser 12 and the combustion chamber 10, the diffuser chamber 30 and combustion region 16 of the combustion chamber 10 are isolated from one another. Conversely, when the burst disk 34 is removed or broken, flow communication is established between the combustion region 16 and the diffuser chamber 30.

The cylindrical wall 22 includes a plurality of relatively narrow, elongated, through-wall slots or openings 40 formed therein. Preferably, the openings 40 are rectangular in shape, and are formed parallel to a longitudinal axis A of the diffuser 10. The slots 40 are configured to provide sufficient flow area or open area for exhausting the combustion gases from the combustion chamber 10 through the diffuser 12 and into the airbag, to rapidly deploy the airbag. At the same time, the slots 40 are sufficiently small to retain debris that may be generated as a result of the combustion process or reaction within the diffuser 12 and combustion chamber 10 and to prevent debris from entering the airbag.

In one embodiment of the diffuser 12 that has an outside diameter of about 0.986 inches or 25.0 millimeters (0.986 in or 25.0 mm), sixteen slots 40 are formed in the diffuser 12, each slot 40 having a height h of about 0.2 in (5.1 mm) and a width w of between about 0.03 in (0.762 mm) and 0.04 in (1.016 mm), for a total flow area of between about 0.096 in$^2$ (62 mm$^2$) and 0.128 in$^2$ (83 mm$^2$). In this embodiment, the slots 40 are equally circumferentially spaced from adjacent slots 40 by an angle $\alpha$, and are thus about 22.5° from respective adjacent slots 40.

Those skilled in the art will recognize that other configurations, patterns and quantities of slots 40 can be used to assure proper flow area while maintaining the slots 40 sufficiently small to retain debris in the combustion chamber 10 and diffuser 12 and to prevent debris from entering the airbag. Such other configurations, patterns and quantities of slots 40 are within the scope of the present invention.

In this embodiment, the opening 28 in the diffuser bottom wall 26 that provides flow communication between the diffuser chamber 30 and the combustion region 16 is circular and has a diameter d of about 0.287 in (7.3 mm), which results in a flow area of about 0.065 in$^2$ (51.85 mm$^2$) when the burst disk 34 is fully removed from the opening 28.

Figure 5A:
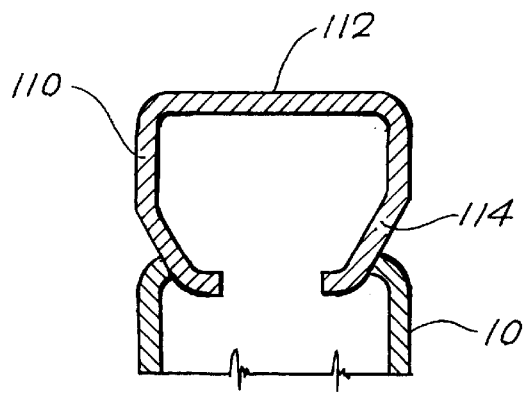
FIGS. 5a–c illustrate various alternate configurations of the diffuser.
Figure 5B:
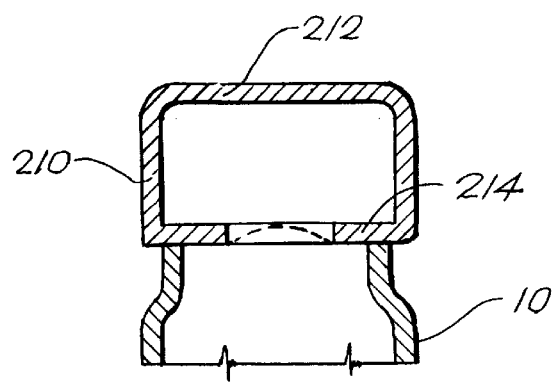
Figure 5C:
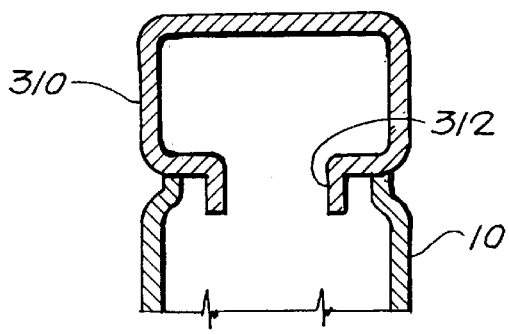

Other overall configurations of the diffuser are illustrated in FIGS. 5a–c, in which the diffuser 110 has a flat top wall 112 and a funnel or cone-shaped bottom end wall 114 (FIG. 5a), in which the diffuser 210 has a flat top wall 212 and a flat bottom wall 214 (FIG. 5b), and in which the diffuser 310 has a depending insert-type bottom wall 312 (FIG. 5c) that inserts into the neck or top of the combustion chamber 10.

Figure 6:
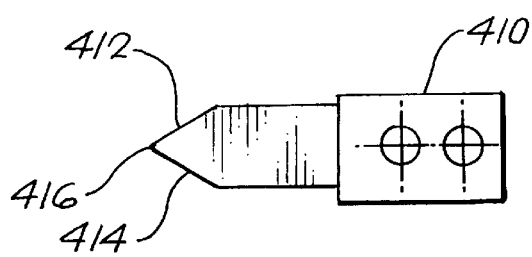
FIG. 6 illustrates a lancing or piercing tool that is used to form the openings or slots through the diffuser wall.

It has been observed that although the slots 40 can be formed by various machining techniques such as drilling, punching or the like, it is most desirable to form the slots 40 by lancing, using a lance element or blade 410 such as that illustrated in FIG. 6. Those skilled in the art will recognize that although drilling is a known and accepted method for forming openings in the wall of structural elements such as the diffuser, there are drawbacks to drilling. For example, the machining parts, e.g., the drill bit, can require frequent maintenance to maintain the drill in working order. This is particularly true if the openings are formed after the diffuser is formed, i.e., after the bottom wall is formed. Moreover, if the end walls of the diffuser, and particularly the bottom end wall, is formed after the drilling operation, the openings can become deformed which can adversely effect the flow area across the openings and thus deployment of the airbag. In addition, drilling a series of small holes can be time consuming and can add significantly to the overall cost of fabricating the diffuser.

Those skilled in the art will also recognize that although punching the openings can be an effective method for forming the diffuser, punching suffers from some of the same drawbacks as drilling. That is, if the bottom wall is formed after punching the openings, the openings may become deformed and may not hold their dimensions. Again, as with drilling, punches can also require frequent maintenance to assure that they are properly operating.

The present lancing process overcomes these drawbacks, and provides additional advantages over drilling and punching methods. As shown in FIG. 6, the lance 410 has first and second essentially mirror image edge portions 412, 414 extending from a central apex 416. As the lance 410 contacts and penetrates the diffuser side wall 22, because the lance 410 is narrow, the material (as illustrated at 50 and 52) that is removed from the wall 22 is separated at the slot 40, in the elongated direction, by the blade edge portions 412, 414.

As the material 50, 52 separates, it curls or rolls inward of the diffuser 12, away from the point of contact to define first and second flashing portions 54, 56. The flashing portions 54, 56 that are cut from the side wall 22 to form the slots or openings 40 remain connected to and intact with the side wall 22 of the diffuser 12, at an interior of the side wall 22, so that the flashing portions 54, 56 do not create cutting debris. It has also been observed that the flashing portions 54, 56 do not adversely effect the flow area across the openings 40 or the total flow through the diffuser 12.

Advantageously, unlike drilled or punched openings, the lanced slots or openings 40 can be formed in the diffuser side wall 22 after the bottom wall 26 is formed. One benefit that is realized by this arrangement is that the diffuser 12 can be formed as a single, unitarily formed part. This reduces the overall cost of fabricating the diffuser 12 because less labor intensive processes are required. In addition, because the flashing portions 54, 56 remain connected to the diffuser side wall 22, less post-formation operations are necessary to finish the part for subsequent assembly of the restraint system.

Figure 7:
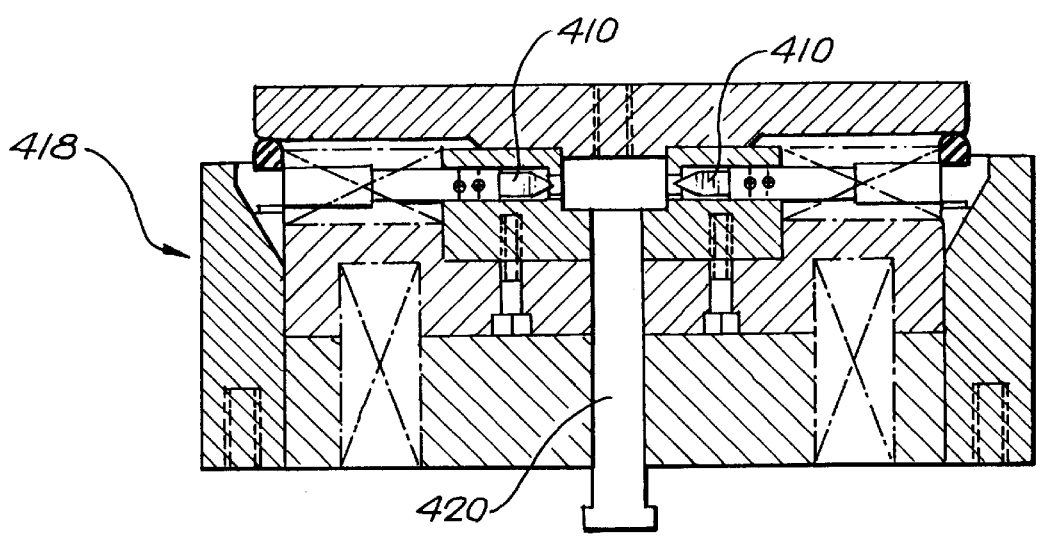
FIG. 7 illustrates an exemplary lancing apparatus for forming the slots in the diffuser.

As seen in FIG. 7, the lance blades 410 (two shown) are mounted to a lancing apparatus 418 that includes a standard 420 for supporting the diffuser 12 during the lancing operation. The lance blades 410 can be equally circumferentially spaced from adjacent lance blades 410 by any variation of angles to form the desired slot 40 arrangement. That is, the diffuser 12 can be positioned much like the hub of a wheel, with the blades 410 positioned as wheel spokes at any of a variety of angles relative to one another. In the arrangement, the blades 410 can contact and pierce the diffuser 12, to form the slots or openings 40 simultaneously, so as to apply substantially equal force on the diffuser 12 from the various locations therearound during the piercing process.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A diffuser for a supplemental restraint system, the supplemental restraint system including an airbag and a combustion chamber for providing a pressurized gas to inflate the air bag, the combustion chamber defining an opening herein for exhausting the pressurized gas, the diffuser comprising:

a substantially cylindrical member having a top wall, a cylindrical side wall and a bottom wall defining a longitudinal axis, the bottom wall having an opening herein having a predetermined flow area and being adjacent to and separated from the combustion chamber opening; and a plurality of elongated, through-wall slots formed in the cylindrical side wall, generally parallel to the diffuser axis, the slots being configured and having a flow area to rapidly inflate the airbag, and being further configured to retain debris generated from the combustion chamber within the diffuser and to prevent the debris from entering the airbag upon inflation, wherein the diffuser is configured to eliminate the need for a screen element within and between the combustion chamber and the diffuser.

2. The diffuser in accordance with claim 1 wherein the slots have a generally rectangular shape.

3. The diffuser in accordance with claim 2 wherein each slot has a height extending parallel to the axis of about 0.20 in and a width of between about 0.03 in and 0.04 in.

4. The diffuser in accordance with claim 3 including sixteen slots, wherein the slots have a total flow area of between about 0.096 $in^2$ and about 0.128 $in^2$.

5. The diffuser in accordance with claim 1 wherein the slots are formed by lancing.

6. A diffuser for a supplemental restraint system, the supplemental restraint system including an airbag and a combustion chamber for providing a pressurized gas to inflate the air bag, the combustion chamber defining an opening therein for exhausting the pressurized gas, the diffuser comprising:

a substantially cylindrical member having a top wall, a cylindrical side wall and a bottom wall defining a longitudinal axis, the bottom wall having an opening therein having a predetermined flow area and being adjacent to and separated from the combustion chamber opening; and a plurality of elongated, through-wall slots formed in the cylindrical side wall, generally parallel to the diffuser axis, the slots being configured and have a flow area to rapidly inflate the airbag, and being further configured to retain debris generated from the combustion chamber within the diffuser and to prevent the debris from entering the airbag upon inflation, wherein each slot is formed by lancing and is formed so as to define at least one flashing portion and wherein the at least one flashing portion remains intact with the diffuser cylindrical side wall upon formation.

7. The diffuser in accordance with claim 6 wherein each slot is formed so as to define first and second flashing portions at opposing ends of the slots, and wherein the flashing portions remain intact with the diffuser cylindrical side wall upon formation.

8. The diffuser in accordance with claim 1 wherein the slots define a total flow area that is at least equal to the diffuser bottom wall opening flow area.

9. The diffuser in accordance with claim 4 wherein the slots define a total flow area that is at least equal to the diffuser bottom wall opening flow area.

* * * * *